Patented June 7, 1949

2,472,581

UNITED STATES PATENT OFFICE 2,472,581

PREPARATION OF ALKOXY PYRAZOLONES

Walter A. Gregory, Oak Ridge, Tenn., assignor to Eastman Kodak Company, Rochester, N. Y., a corporation of New Jersey No Drawing. Application August 22, 1945, Serial No. 612,137

3 Claims. (Cl. 260—310)

This invention relates to 3-alkoxy-pyrazolones and to a method for preparing them.

The 3-alkoxy pyrazolones are useful as couplers in color photography and these compounds and a method for their preparation are described in Porter, Weissberger and Gregory U. S. patent application, Ser. No. 569,428, filed December 22, 1944, now U. S. Patent 2,439,098. The present application relates to an improved method for the preparation of the 3-alkoxy pyrazolones.

If an ethereal solution of acetimino ethyl ether is shaken with an aqueous solution of phenyl hydrazine hydrochloride according to Schmidt, Ber., vol. 47, page 2545 (1914), the imino group is replaced by the phenylhydrazono group according to the following reaction.

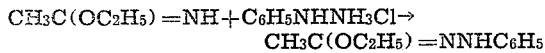

This reaction suggests a novel method for the synthesis of 3-alkoxy-5-pyrazolones. If an ethyl $\beta$-alkoxy-$\beta$-iminopropionate is reacted with a mono-substituted hydrazine, preferably as the hydrochloride, under suitable conditions, a product is formed which condenses to the 3-alkoxy-5-pyrazolone according to the following reactions.

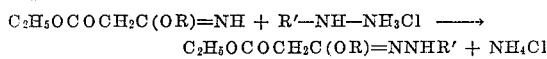

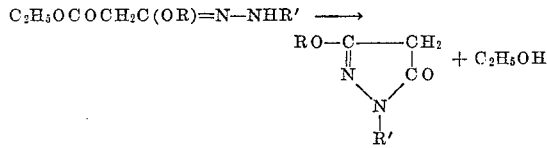

In the general formulas above, R may be any aliphatic radical such as methyl, ethyl, propyl or butyl and R' may be any unsubstituted or substituted aliphatic, aromatic or heterocyclic radical such as methyl, ethyl, propyl, butyl, phenyl, sulfophenyl, nitrophenyl, sulfamylphenyl or benzothiazolyl.

According to my invention, an ether solution of a mono-substituted hydrazine and an ethyl $\beta$-alkoxy-$\beta$-iminopropionate are mixed together and the mixture stirred vigorously while cooling in an ice bath for several minutes. The ice bath is removed after a few minutes and the stirring continued for approximately one hour. The reaction product is then isolated from the reaction mixture by suitable means.

The mono-substituted hydrazine used in the reaction is preferably used as the hydrochloride and is dissolved or suspended in water. The ethyl $\beta$-alkoxy-$\beta$-imino propionate is dissolved in ether and the ether solution mixed with the solution of the hydrazine.

My invention will be further illustrated by reference to the following examples.

*Example 1.—Preparation of 1-phenyl-3-ethoxy-5-pyrazolone*

Theoretical equivalent amounts of phenyl hydrazine dissolved in water and ethyl $\beta$-ethoxy-$\beta$-iminopropionate in ether solution are mixed and the mixture stirred vigorously while cooling in an ice bath. The ice bath is removed after 10 minutes and the stirring continued for one hour. The ether layer from the reaction mixture is extracted exhaustively with 2% sodium hydroxide solution and the alkaline solution acidified with acetic acid to give the desired product. The yield is 54% of a product having a melting point of 116.5 to 117.5° C.

*Example 2.—Preparation of 1-p-sulfamylphenyl-3-ethoxy-5-pyrazolone*

Theoretically equivalent amounts of p-sulfamylphenylhydrazine hydrochloride dissolved in water and ethyl $\beta$-ethoxy-$\beta$-imino-propionate dissolved in ether are mixed and the mixture stirred vigorously while cooling in an ice bath. The ice bath is removed after 10 minutes and stirring continued for one hour. The reaction mixture is filtered to give a 92% yield of the intermediate product. Ethyl $\beta$-ethoxy-$\beta$[$\beta$(p-sulfamylphenyl) hydrazono]-propionate, having a melting point of 120–122° C. Ring closure of the intermediate product is affected by refluxing in one equivalent of sodium ethylate solution for ½ hour. Acidification of the mixture with acetic acid gives a 86% yield of the desired product having a melting point of 199–201° C.

Another 3-alkoxy-5-pyrazolone may be prepared similarly. It is an essential feature of my process that the reaction proceed in ether solution at a low temperature. If a mono-substituted hydrazine and ethyl $\beta$-ethoxy-$\beta$-iminopropionate (ethyl malonate monoimidoester) are refluxed together, the product is not a 3-alkoxy-pyrazolone but a 3-amino-pyrazolone (J. A. C. S., vol. 66, page 1851, 1944).

It will be understood that the examples included herein are illustrative only and that my invention is to be taken as limited only by the scope of the appended claims.

I claim:

1. The method of producing a 3-alkoxy-5-pyrazolone, which comprises stirring an ether solution of a mono-substituted hydrazine selected from the group consisting of alkyl, mononuclear aryl and benzothiazolyl hydrazines and an ethyl $\beta$-alkoxy-$\beta$-iminopropionate while cooling in an ice bath for several minutes, then removing the mixture from the ice bath and continuing the stirring for approximately one hour, and isolating the reaction product from the mixture.

2. The method of producing a 3-ethoxy-5-pyrazolone which comprises stirring an ether solution of a mono-substituted hydrazine selected from the group consisting of alkyl, mononuclear aryl and benzothiazolyl hydrazines and ethyl $\beta$-ethoxy-$\beta$-imino propionate while cooling in an ice bath for approximately 10 minutes, then removing the mixture from the ice bath and continuing stirring for approximately one hour and isolating the reaction product from the mixture.

3. The method of producing 1-phenyl-3-ethoxy-5-pyrazolone which comprises stirring an ether solution of phenylhydrazine hydrochloride and ethyl $\beta$-ethoxy-$\beta$-imino propionate while cooling in an ice bath for approximately 10 minutes, then removing the mixture from the ice bath and continuing the stirring for approximately one hour and isolating the reaction product from the mixture.

WALTER A. GREGORY.

No references cited.